(12) United States Patent
Hanson (10) Patent No.: US 8,026,848 B2
(45) Date of Patent: Sep. 27, 2011

(54) RADIO-BASED POSITION LOCATION SYSTEMS, ANTENNA CONFIGURATIONS, AND METHODS FOR DETERMINING ANTENNA CONFIGURATIONS

(75) Inventor: James Edward Hanson, Tucson, AZ (US)

(73) Assignee: Freeport McMoRan Copper & Gold Inc., Phoenix, AZ (US)

( * ) Notice: Subject to any disclaimer, the term of this patent is extended or adjusted under 35 U.S.C. 154(b) by 558 days.

(21) Appl. No.: 12/184,727

(22) Filed: Aug. 1, 2008

(65) Prior Publication Data
US 2010/0026577 A1    Feb. 4, 2010

(51) Int. Cl.
*H01Q 3/00*    (2006.01)
(52) U.S. Cl. ......................................... 342/359
(58) Field of Classification Search .................. 342/359, 342/458, 367, 423, 432; 455/575.5
See application file for complete search history.

(56) References Cited

U.S. PATENT DOCUMENTS

| | | | |
|---|---|---|---|
| 5,406,275 A | 4/1995 | Hassett et al. | |
| 5,532,709 A | 7/1996 | Talty | |
| 6,191,733 B1 | 2/2001 | Dizchavez | |
| 6,285,318 B1 | 9/2001 | Schoen et al. | |
| 6,665,333 B2 | 12/2003 | McCrady et al. | |
| 7,139,651 B2 | 11/2006 | Knowlton et al. | |
| 7,245,267 B2 | 7/2007 | Gottl et al. | |
| 7,269,174 B2 | 9/2007 | Olson et al. | |
| H002224 H * | 10/2008 | Madden | 342/424 |
| 7,715,466 B1 * | 5/2010 | Oh et al. | 375/211 |
| 2007/0268155 A1 | 11/2007 | Holmes et al. | |
| 2008/0040029 A1 | 2/2008 | Breed | |

OTHER PUBLICATIONS

International Search Report dated Jul. 31, 2009 for PCT Application No. PCT/US09/48654, 4 pages.
Written Opinion of the International Searching Authority dated Jul. 31, 2009 for PCT Application No. PCT/US09/48654, 6 pages.

\* cited by examiner

*Primary Examiner* — Thomas Tarcza
*Assistant Examiner* — Nga X Nguyen
(74) *Attorney, Agent, or Firm* — Fennemore Craig, P.C.

(57) ABSTRACT

A radio-based position location system for determining a relative position of a first object with respect to a second object may include a first radio operatively associated with the first object. A first directional antenna having at least a high gain region is mounted to the second object so that the high gain region is directed generally outwardly from the second object and defines a first detection zone. A second directional antenna having at least a high gain region is also mounted to the second object and is oriented so that the high gain region is also directed generally outwardly and defines a second detection zone. A second radio connected to the first and second directional antennas exchanges radio signals with at least the first radio to determine the relative position of the first object with respect to the second object at least in part by determining a time-of-flight of a radio signal. The radio signals are primarily exchanged via the first directional antenna when the first object is in the first detection zone, whereas the radio signals are primarily exchanged via the second directional antenna when the first object is in the second detection zone.

24 Claims, 4 Drawing Sheets

RADIO-BASED POSITION LOCATION SYSTEMS, ANTENNA CONFIGURATIONS, AND METHODS FOR DETERMINING ANTENNA CONFIGURATIONS

TECHNICAL FIELD

This invention relates to position location systems in general and more specifically to radio-based position location systems.

BACKGROUND

Various types of position location systems are known in the art and may be used in a wide variety of circumstances wherein it is desired to locate or determine the position of one object with respect to another object. One type of position location system is radio-based and uses radio signals to determine the relative position of a first object (i.e., having a radio receiver associated therewith) with respect to a second object (i.e., having a radio transmitter associated therewith). Many such radio-based position location systems use the transit time or "time-of-flight" of a radio signal traveling between the transmitter and receiver to determine the distance between the transmitter and receiver. If two or more transmitters are used, triangulation methods may be used to determine more precisely the relative location of the receiver with respect to the transmitters. An example of a radio-based time-of-flight position location system is shown and described in U.S. Pat. No. 6,665,333, issued Dec. 16, 2003, and entitled "Methods and Apparatus for Determining the Time of Arrival of a Signal" which is specifically incorporated herein by reference for all that it discloses.

While such time-of-flight and/or triangulation radio-based position location systems have been used in a wide range of applications and environments, they have proven to be difficult to implement in certain applications and environments. For example, it has proven difficult to implement such systems in "high reflectivity" environments that contain objects or geologic features that reflect the radio signals produced by the transmitters. More specifically, the radio-reflective objects or features create substantial multi-path and other types of interference that can make it difficult, and in some cases impossible, to accurately locate the relative positions of the objects by means of time-of-flight. Still other applications may require the ability to detect the relative locations of very large objects. In such instances, the physical sizes of the objects can create problems in that portions of the large objects may mask or block the radio signals, thereby preventing them from reaching the receiver. The large objects can also be a source of multi-path interference, which again can make it difficult or impossible to accurately locate position.

Consequently, a need exists for a radio-based position location system that may be utilized in environments that are subject to interference (e.g., multi-path interference), and/or signal blocking due to the presence of large objects within the detection area.

SUMMARY OF THE INVENTION

One embodiment of a radio-based position location system for determining a relative position of a first object with respect to a second object may include a first radio operatively associated with the first object. A first directional antenna having at least a high gain region is mounted to the second object so that the high gain region is directed generally outwardly from the second object and defines a first detection zone. A second directional antenna having at least a high gain region is also mounted to the second object and is oriented so that the high gain region is also directed generally outwardly and defines a second detection zone. A second radio connected to the first and second directional antennas exchanges radio signals with at least the first radio to determine the relative position of the first object with respect to the second object at least in part by determining a time-of-flight of a radio signal. The radio signals are primarily exchanged via the first directional antenna when the first object is in the first detection zone, whereas the radio signals are primarily exchanged via the second directional antenna when the first object is in the second detection zone.

Also disclosed is an antenna configuration for a first object that allows a second object nearby the first object to be detected and located by means of a time-of-flight radio system. The antenna configuration may comprise a plurality of directional antennas mounted to the first object, each of which has a radiation pattern that comprises at least a high gain region. The plurality of directional antennas are oriented with respect to the first object so that the high gain regions of the plurality of directional antennas are directed generally outwardly from the first object and define corresponding detection zones. The time-of-flight radio system exchanges radio signals between radios on at least the first object and the second object to determine the relative position of the second object with respect to the first object. The radio signals are primarily exchanged via the one of the plurality of directional antennas that corresponds to the detection zone in which the second object is located.

The present invention also involves a method for determining an antenna configuration for a second object to allow a first object nearby the second object to be detected and located by means of a time-of-flight radio system. The method may comprise: Defining one or more detection zones around the second object; determining a radiation pattern for a directional antenna, the radiation pattern having a high gain region; and mounting a plurality of the directional antennas on the second object so that the high gain regions of the directional antennas are generally directed outwardly from the second object and toward the one or more detection zones.

Other features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Illustrative and presently preferred exemplary embodiments of the invention are shown in the drawings in which.

DETAILED DESCRIPTION

Figure 1:
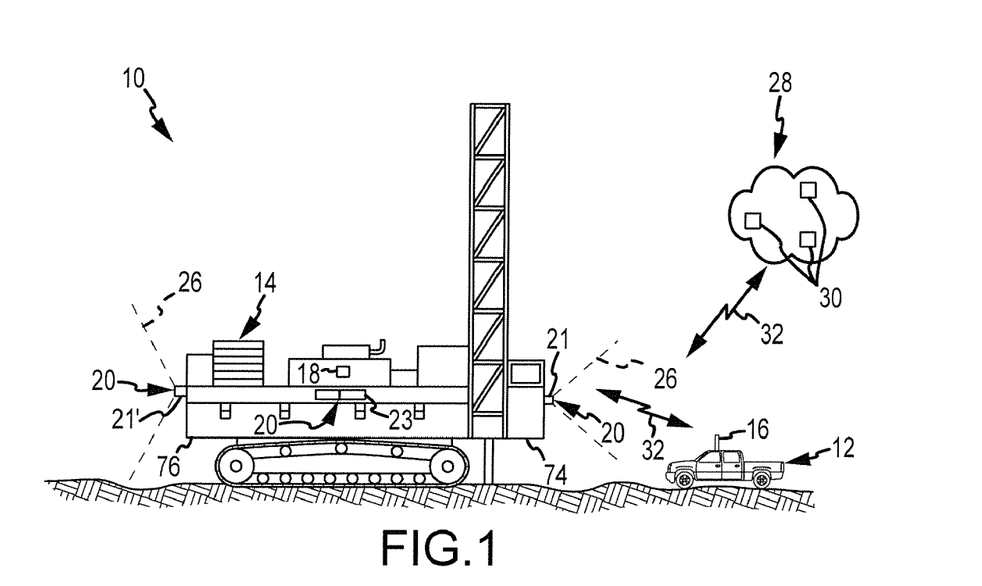
FIG. 1 is a side view in elevation of one embodiment of a position location system as it could be used in conjunction with a blast hole drill rig in an open pit mining environment.
Figure 2:
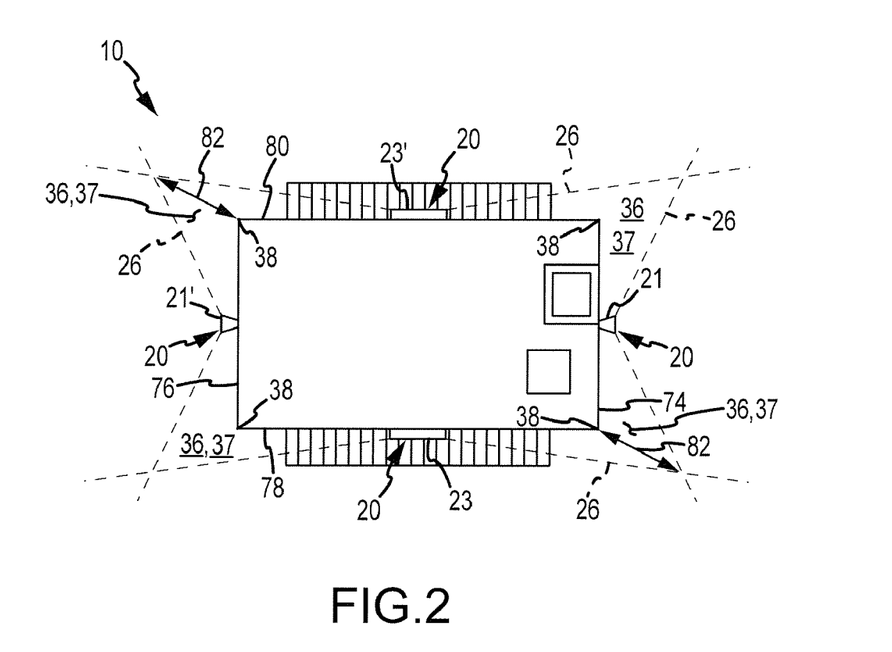
FIG. 2 is a plan view of the drill rig illustrated in FIG. 1 showing the detection zones defined by the various directional antennas.

One embodiment of a radio-based position location system 10 is illustrated in FIGS. 1 and 2 as it could be used in an open pit mining environment to allow the position of a service vehicle 12 (i.e., a first object) to be determined with respect to a drill rig 14 (i.e., a second object). Alternatively, and as will be described in much greater detail herein, the methods and apparatus of the present invention may be utilized in other environments and applications.

In the particular example illustrated in FIGS. 1 and 2, the service vehicle 12 is provided with a first radio 16, whereas the drill rig 14 is provided with a second radio 18. The second radio 18 is operatively connected to one or more directional antennas 20 that are provided on (e.g., mounted to) drill rig 14. As will be explained in further detail herein, the various directional antennas 20 may be substantially identical to one another or may differ from one another depending on various factors and considerations described herein. For example, in the embodiment shown in FIGS. 1 and 2, the directional antennas 20 provided on drill rig 14 comprise two (2) narrow-angle antennas 21, 21' and two (2) wide-angle antennas 23, 23'. The narrow-angle antennas 21, 21' are positioned at the front and rear ends 74 and 76 of drill rig 14, whereas the wide-angle antennas 23, 23' are positioned on the right and left sides 78 and 80 of drill rig 14.

Figure 3:
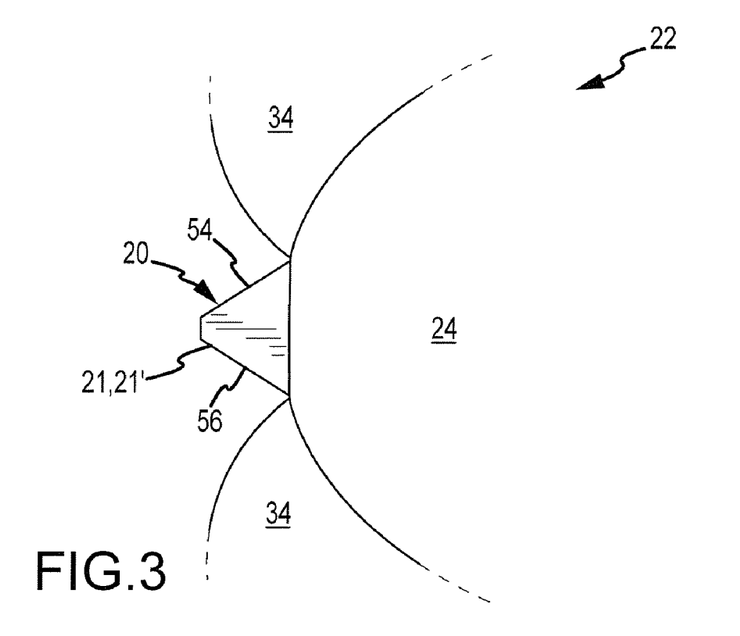
FIG. 3 is a schematic representation of high and low gain regions of a narrow-angle directional antenna.
Figure 4:
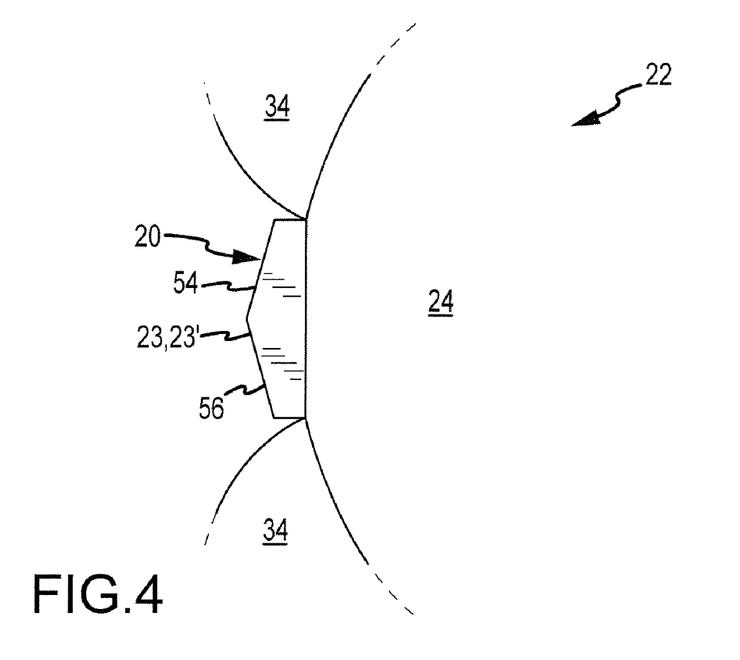
FIG. 4 is a schematic representation of high and low gain regions of a wide-angle directional antenna.
Figure 5:
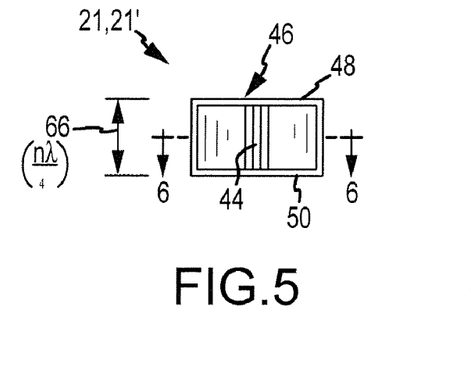
FIG. 5 is a front view in elevation of a narrow-angle directional antenna.
Figure 6:
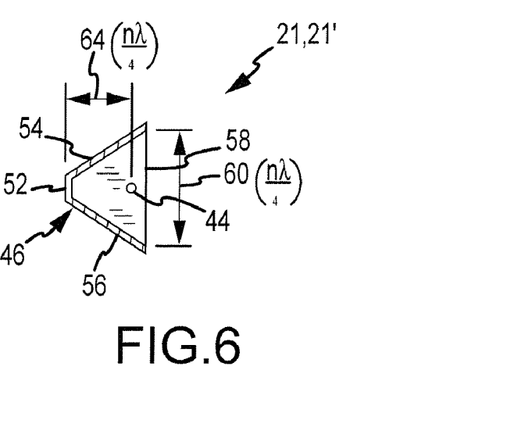
FIG. 6 is a cross-sectional plan view of the narrow-angle directional antenna taken along the line 6-6 of FIG. 5.
Figure 7:
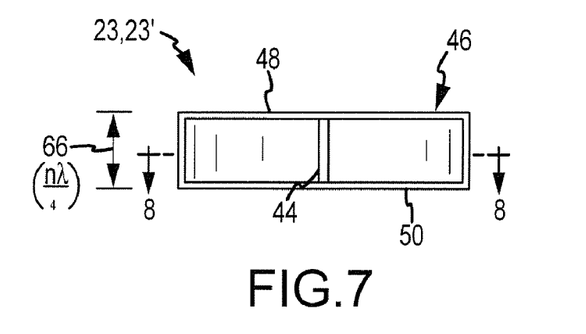
FIG. 7 is a front view in elevation of a wide-angle directional antenna.
Figure 8:
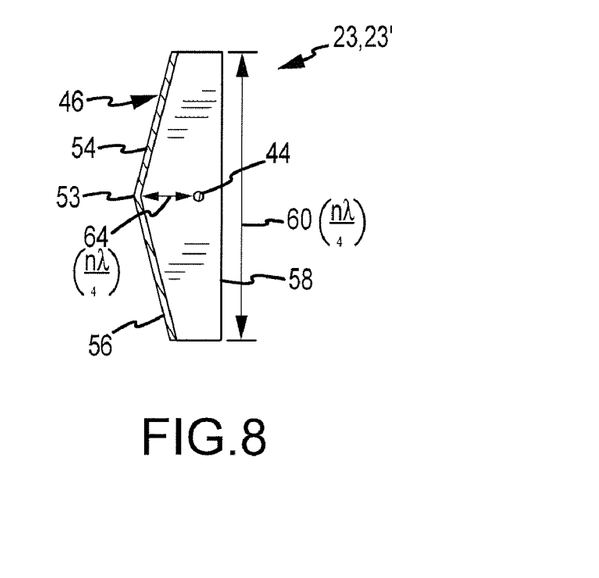
FIG. 8 is a cross-sectional plan view of the wide-angle directional antenna taken along the line 8-8 of FIG. 7.

Regardless of whether the directional antennas 20 comprise narrow-angle antennas 21, 21' or wide-angle antennas 23, 23', each antenna 20 has associated with it a radiation pattern 22, as best seen in FIGS. 3 and 4. The radiation pattern 22 of each directional antenna 20 may comprise at least a high gain region 24. Typically, radiation pattern 22 will also comprise one or more low gain regions 34. As will be described in much greater detail below, the various directional antennas 20 are mounted to the drill rig 14 so that their respective high gain regions 24 are directed generally outwardly and define respective detection zones 26 around the drill rig 14. See FIGS. 1 and 2.

In the exemplary embodiment shown and described herein, the first and second radios 16 and 18 comprise a portion of a position-enabled mesh network system 28 having a plurality of system components or "nodes" 30 provided at various locations throughout the environment (e.g., open pit mine). In the particular mesh network system 28 shown and described herein, some or all of the nodes 30 may comprise radios or transceivers that are capable of transmitting and receiving radio signals. Nodes 30 comprising radios (e.g., 16 and 18) that are "position enabled" will allow the mesh network system 28 to determine the locations of the position enabled nodes 30 (e.g., radios 16 and 18), not only within the mesh network 28, but with respect to one another as well. Generally speaking, the ability of the mesh network 28 to determine the locations of the various position-enabled nodes 30 is based on a combination of time-of-flight measurement (i.e., the time for radio signals to travel between the antennas associated with at least two radios) and triangulation (involving time-of-flight information from three or more radios).

In operation, the position location system 10 of the present invention may be used to determine the relative position of the service vehicle 12 (i.e., a first object) with respect to the drill rig 14 (i.e., a second object) and vice-versa, by exchanging radio signals 32 at least in part between the antennas connected to the various radios 16 and 18, although additional radios (i.e., nodes 30) in the mesh network 28 will usually be involved as well. In the embodiment illustrated in FIGS. 1 and 2, the first radio 16 is provided with a single antenna (not shown), whereas the second radio 18 is connected to the various directional antennas 20 mounted to drill rig 14. The radio signals 32 transmitted and received between the radios 16 and 18 are exchanged via different ones of the directional antennas 20 connected to radio 18 depending on the relative positions of the first and second objects 12 and 14.

For example, and with respect to the particular embodiment illustrated in FIGS. 1 and 2, the radio signals 32 transmitted and received between first and second radios 16 and 18 are exchanged primarily via a first directional antenna 20 (e.g., the narrow-angle antenna 21 mounted to the front 74 of drill rig 14) when the vehicle 12 (i.e., the first object) is in the detection zone 26 defined by narrow-angle antenna 21. Alternatively, if the vehicle 12 is located at a different position, such as, for example, within the detection zone 26 of wide-angle antenna 23 mounted on right side 78 of drill rig 14, then the radio signals 32 traveling between the radios 16 and 18 are exchanged primarily via wide-angle antenna 23. If the vehicle 12 is located at still yet another position with respect to drill rig 14, such as, for example, within the detection zone 26 of narrow-angle antenna 21' mounted to the rear 76 of drill rig 14, then the radio signals 32 are exchanged primarily via narrow-angle antenna 21'. Accordingly, the position of the vehicle 12 with respect to the drill rig 14 can be readily determined regardless of the position of the vehicle 12 around drill rig 14.

It should be noted that while the radio signals 32 between radios 16 and 18 are exchanged primarily via the directional antenna 20 that corresponds to the particular detection zone 26 within which the service vehicle 12 is located, it is possible that the radio signals 32 between radios 16 and 18 may also be exchanged between one or more of the other directional antennas 20 that do not correspond to the detection zone within which the vehicle 12 is located. However, any such radio signals 32 will generally result in received signals having substantially reduced strength and can be easily filtered out or otherwise made to be ignored by the mesh network system 28.

In this regard it should also be noted that radio signals 32 will also need to be exchanged between radios 16, 18 and other radios 30 comprising mesh network 28 in order to provide sufficient time-of-flight data to allow the relative positions of the vehicles 12 and 14 to be determined by triangulation methods. That is, in addition to the fact that radio signals 32 will be exchanged between radios 16 and 18 (and antennas 20 associated with radio 18) in the manner already described, radio signals 32 will also be exchanged between/among radios 16, 18 and other nodes or radios 30 comprising the mesh network 28. With regard to radio signals 32 that are exchanged between radio 18 and such other radios 30 in the mesh network, such radio signals 32 will be exchanged primarily via the particular antenna on drill rig 14 that defines the detection zone 26 within which such other radios 30 are located. For example, if one of the other radios 30 in the mesh network 28 is located in detection zone 26 defined by antenna 23', then the radio signals 32 between radio 18 and such other radio 30 will be exchanged primarily via antenna 23', even though the radio 16 on vehicle 12 may be located in the detection zone 26 defined by antenna 23.

A significant advantage of the position location system 10 of the present invention is that it allows radio-based position location systems, such as a position-enabled mesh network system 28, to be used in environments and applications currently thought to be ill-suited for the deployment of such systems. For example, the position location system 10 of the present invention may be readily used in environments, such as open pit mines, that are subject to significant multi-path interference (e.g., due to the presence of geologic formations or other structures, such as large mining equipment, that reflect radio signals). The teachings provided herein may be utilized to develop antenna configurations having reduced susceptibility to multi-path interference compared to conventional position location systems.

Besides the advantage of being able to effectively utilize the position location system 10 in environments subject to severe multi-path interference, the position location system 10 may also be used in applications that involve large structures or objects that block or attenuate radio signals. As already mentioned, environments that may severely attenuate or block radio signals can create dead zones and blind spots that adversely affect the reliability and accuracy of conventional position detection systems, often to the point where they become unusable. The teachings provided herein can be used to develop antenna configurations that substantially reduce or eliminate blind spots or dead zones that would otherwise be present in the networked radio system.

Still yet another advantage of the present invention is that it can also be readily deployed on large moveable structures, such as heavy mining equipment. More specifically, large structures or vehicles, such heavy mining equipment, pose the problem of relating the extremities of the structures or vehicles with respect to the location of the antenna (which is what is what is actually located by the position location system). While it is theoretically possible to determine the locations of extremities of large structures or vehicles based on position data derived from a single antenna, such theoretical solutions have proven difficult to apply in the field.

For example, if a single antenna is placed on a large structure or vehicle, the antenna must be located at a position on the structure or vehicle so that it will be visible to the antennas associated with objects moving around the large structure or vehicle. Of course, various features of the large structure or vehicle will create significant blind spots, within which detection of such other objects will be difficult or impossible. While such blind spots could be minimized by mounting the antenna at a high location (e.g., on a mast of a drill rig), there is usually a significant degree of relative movement between the mast and other features of the vehicle or structure, and such relative movement must be compensated for before it will be possible to accurately locate other, typically smaller objects located nearby.

While it might be possible to solve the blind spot problem by placing a plurality of omni-directional antennas at various locations around the large vehicle or structure, such a multiple antenna configuration typically creates other problems. For example, if two or more such antennas are visible to the antenna of the object to be detected, the problem arises as to which antenna should be used to determine the position of the object to be detected. If one antenna is located 10 meters from the object to be detected, whereas the other antenna (also visible to the object) is located 15 meters from the object, it will be difficult to determine the true relative position of the object to be detected, as it could either be 10 meters or 15 meters away. In summation, then, the ability to detect an object nearby a large vehicle or structure is by no means trivial, particularly where the relative positions need to be determined within a meter or less (e.g., due to safety considerations).

Having briefly described the position location system 10 according to one embodiment of the present invention, as well as a few of its more significant features and advantages, various exemplary embodiments of the position location system 10 will now be described in detail. However, before proceeding with the description it should be noted that while the position location system 10 is shown and described herein as it could be used with specific vehicle types (e.g., a blast hole drill rig and a smaller service vehicle) in a specific environment (e.g., an open pit mine), persons having ordinary skill in the art will readily recognize, after becoming familiar with the teachings provided herein, that the present invention could be utilized in any of a wide range of other environments and in conjunction with other types of vehicles or objects. Consequently, the present invention should not be regarded as limited to the specific environments, vehicles, applications, and configurations shown and described herein.

Proceeding now with the description, and with reference back now primarily to FIGS. 1 and 2, one embodiment 10 of a position location system according to the teachings provided herein may be used to determine the position of at least one other object 12 with respect to a blast hole drill rig 14. More specifically, the object(s) 12 to be detected may comprise mine personnel or equipment (e.g., service vehicles) that may approach or operate nearby the drill rig 14. Each of the various objects 12 desired to be detected (e.g., men and/or other equipment) is provided with a radio 16. Likewise, blast hole drill 14 is provided with a radio 18.

As was briefly described above, the radios 16, 18 form a part of a position-enabled mesh network system 28 that comprises a plurality of system components or nodes 30 that function together to form the mesh network 28. The various nodes 30 of mesh network system 28 may comprise radios or transceivers that are capable of transmitting and receiving radio signals. Nodes 30 comprising radios (e.g., 16 and 18) that are "position enabled" will allow the mesh network system 28 to determine the locations of the nodes 30, thus radios 16 and 18, not only within the network 28, but with respect to one another as well (i.e., peer-to-peer). The ability of the network 28 to determine the locations of the various position-enabled nodes 30 is based on a combination of time-of-flight measurement (i.e., the time for radio signals to travel between two radios) and triangulation (i.e., involving time-of-flight information from three or more radios).

Position-enabled mesh network systems 28 of the type that may be utilized in conjunction with the present invention are well-known in the art and are readily commercially available. Consequently, the present invention should not be regarded as limited to any particular type of mesh network system. However, by way of example, in one embodiment, the mesh network system 28 may comprise a plurality of radios or nodes 30 (i.e., including position-enabled radios 16 and 18) manufactured by the Motorola Corporation of Schaumburg, Ill. (US).

Briefly, the position-enabled mesh radios (i.e., 16, 18, and various position-enabled radios 30) of the type described herein are capable of providing highly-accurate position location data, typically on the order of 1 meter or less. When used in favorable conditions (e.g., environments that are substantially free of multi-path interference or undesired signal attenuation), the system is capable of providing location data on the order of a few tens of centimeters. However, when used in unfavorable conditions, such as environments that are subject to multi-path interference and undesired signal attenuation, the positional accuracy, or even the ability to reliably obtain any position information regardless of accuracy, can degrade to the point where the system becomes unusable. The present invention allows such a radio-based position location system to be effectively used in such unfavorable conditions.

Indeed, effective implementation of the teachings provided herein may allow such a radio-based position location system to approach or even achieve the maximum positional accuracy of which the system may be capable.

In the exemplary embodiments shown and described herein wherein the radio-based position location system comprises a portion of a position-enabled mesh radio network (e.g., network 28 illustrated in FIG. 1), then each object 12 (e.g., man or service vehicle) expected to approach or operate nearby the blast hole drill 14 ideally should be provided with its own position-enabled mesh radio 16. In the case where the first object 12 is small relative to the drill rig 14, e.g., where the first object 12 is a man or a service vehicle, for example, then the first object 12 may be provided with a radio 16 having a single antenna, such as an omni-directional antenna. However, if the first object 12 is large, then it may be required or desired to provide the object with an antenna array or configuration that comprises a plurality of directional antennas arranged in accordance with the teachings provided herein. For example, if one or more of the objects 12 to be monitored comprises a large dozer or haul truck, then it will be generally desirable to provide such large objects 12 with multiple antenna configurations of the type similar to that shown for drill rig 14.

Moreover, because radio-based position location systems ultimately detect the relative positions of the radios based on the locations of the antennas (as opposed to the locations of the radios), special considerations are involved when the relative positions of two large objects are to be determined, or where one of the objects is large in relation to the other. For example, the antennas 20 should be configured to provide substantially continuous coverage over areas within which other objects are to be detected, with few or no blind spots. The antenna configuration should also be arranged so as to minimize the likelihood that two or more antennas will receive the same signals from the radio (e.g., 16) located on the object (e.g., 12) to be detected. As mentioned above, ambiguities about the position of the object (e.g., 12) to be detected can be created where two or more antennas receive the radio signals from the radio on the object to be detected.

In accordance with the foregoing issues, the second radio 18 may be operatively associated with one or more directional antennas 20. The various directional antennas 20 may be identical to one another or may differ from one another depending on the particular application and the area or region that is to be covered by the antennas 20. In the embodiment shown and described herein, i.e., wherein it is desired to provide coverage around a drill rig 14 having a substantially rectangular configuration (FIG. 2) and wherein it is desired to provide coverage with four (4) separate directional antennas 20, the array of directional antennas 20 may comprise may comprise two (2) narrow-angle antennas 21, 21' and two (2) wide-angle antennas 23, 23'. The narrow-angle antennas 21, 21' may be positioned at the front and rear ends 74 and 76 of drill rig 14, whereas the wide-angle antennas 23, 23' may be positioned on the left and right sides 78 and 80 of drill rig 14.

However, and regardless of whether the directional antennas 20 comprise narrow-angle antennas 21, 21' or wide-angle antennas 23, 23', each antenna 20 has associated with it a radiation pattern 22, as best seen in FIGS. 3 and 4.

Before proceeding with the description, it should be noted that whether the specific pattern is a radiation pattern or a receiving pattern depends on whether the antenna is being used as a transmitting antenna or as a receiving antenna. Generally speaking, the radiation and receiving patterns of a radio frequency antenna are substantially identical to one another (i.e., as a consequence of reciprocity). Accordingly, the terms "radiation pattern" and "receiving pattern" may be used interchangeably herein and without strict regard as to whether the antenna is being used as a transmitting antenna or a receiving antenna. In addition, it should be noted that the radiation (or receiving) patterns illustrated herein are notional only and do not necessarily represent the actual radiation (or receiving) pattern that would be associated with the antenna. The actual radiation pattern of a given directional antenna may be determined experimentally (e.g., via an antenna range), computationally (e.g., via a computer program that simulates antenna performance), or even intuitively.

Continuing now with the description, the radiation patterns 22 of the various antennas 20 may comprise at least respective high gain regions 24, as best seen in FIGS. 3 and 4. In the specific example embodiments shown and described herein, the high gain regions 24 of antennas 20 are flanked on either side by low gain regions 34. The size and shape of the particular regions (e.g., high gain regions 24 and low gain regions 34) will depend on a variety of factors, including the particular angle defined between the side reflectors 54 and 56 of the antenna 20. For example, and as will be described in greater detail below, the smaller the angle between the side reflectors 54, 56, the more narrow will be the high gain region 24 of the antenna 20. Hence, the narrow-angle antenna (e.g., 21, 21') illustrated in FIG. 3 has a smaller or more narrow high gain region 24 compared to the wide-angle antenna (e.g., 23, 23') illustrated in FIG. 4, which has a larger or wider high gain region 24. Consequently, an array or configuration of antennas 20 comprising both narrow-angle antennas (e.g., 21, 21') and wide-angle antennas (e.g., 23, 23') may be used to advantage in certain applications.

For example, and referring back now primarily to FIG. 2, the various directional antennas 20 are mounted on the blast hole drill rig 14 so that their respective high gain regions 24 are directed generally outwardly and define respective detection zones 26 around the drill rig 14. In order to provide substantially continuous coverage around the drill rig 14, i.e., so that another object 12 (e.g., a man or a service vehicle) provided with a radio 16 will be detectable regardless of its position around the drill rig 14, four (4) separate directional antennas 20 are mounted to the drill rig 14. More specifically, two (2) narrow-angle directional antennas 21, 21' are mounted to the front 74 and rear 76 of drill rig 14, respectively, whereas two (2) wide-angle directional antennas 23, 23' are mounted to the right and left sides 78 and 80 of drill rig 14. In such an arrangement, the high gain regions 24 (FIGS. 3 and 4) of the respective directional antennas 20 define detection zones 26 that are directed generally outwardly from the drill rig 14 in the manner schematically illustrated in FIG. 2.

It should be noted that it may not always be possible to provide complete coverage around the object 14. For example, the detection zones 26 illustrated in FIG. 2 include zones or regions 36 adjacent the corners 38 of drill rig 14 that are outside the high gain regions 24 (FIGS. 3 and 4) defined by the various antennas 20. Consequently, it may be difficult to detect an object (e.g., 12) located within these regions 36. While the size or extent of each region 36 could be reduced by changing the locations and orientations of the various antennas 20, care must be taken to avoid excessive overlap of the detection zones 26 of adjacent antennas 20. For example, excessive overlap could result in the undesirable circumstance of two adjacent antennas 20 detecting radio signals produced by the radio 16 on the object 12 located within sight of both antennas 20.

This problem may be solved in one embodiment by arranging the antennas 20 so that the low gain regions 34 (FIGS. 3 and 4) of adjacent antennas 20 (e.g., narrow-angle antenna 21 and wide-angle antenna 23) are adjacent one another or even slightly overlapping. In such an arrangement, the low gain regions 34 of adjacent antennas 20 will define a zone of diminished sensitivity 37 that is co-extensive with region 36. In one embodiment, the design of the directional antennas 20 is such that the zone of diminished sensitivity 37 has a sensitivity that is about 6 dB lower than the sensitivity in the detection zones 26. The zone of diminished sensitivity 37 will allow for the generally reliable detection of an object 12 located within the zone 36, but without providing excessive overlap of the detection zones 26 that might otherwise create problems.

Referring now primarily to FIGS. 5-8, each directional antenna 20 (e.g., narrow-angle antennas 21, 21' and wide-angle antennas 23, 23') may comprise an antenna element 44 and a reflector assembly 46. Reflector assembly 46 may comprise a top plate 48 and a bottom plate 50 that are positioned in generally parallel, spaced-apart relation. Reflector assembly 46 may also comprise first and second side reflectors 54 and 56 that extend substantially between the top and bottom plates 48 and 50. The first and second side reflectors 54 and 56 are angled generally outwardly and define an open end or aperture 58 of the reflector assembly 46. The open end or aperture 58 has a length 60. The first and second side reflectors 54 and 56 may intersect one another at a corner 53, as in the wide-angle antenna embodiment 23, 23' illustrated in FIGS. 7 and 8. Alternatively, the first and second side reflectors 54 and 56 may be joined by a rear reflector 52, as illustrated in the narrow-angle antenna embodiment 21, 21' shown in FIGS. 5 and 6. Antenna element 44 may comprise an omni-directional antenna (e.g., a dipole) and may be positioned at about the open end 58 of reflector assembly 46 at a location that is substantially equidistant from the first and second side reflectors 54 and 56.

As mentioned above, the angle at which the side reflectors 54, 56 meet determines whether high gain region 24 (FIGS. 3 and 4) of the antenna 20 is wide or narrow. A narrow angle between the side reflectors 54 and 56 will result in a directional antenna 20 having a relatively narrow high gain region 24, as illustrated in FIG. 3, and is referred to herein as narrow-angle antenna 21, 21'. Alternatively, a wide angle between the side reflectors 54 and 56 will result in a directional antenna 20 having a relatively wide high gain region, as illustrated in FIG. 4, and is referred to herein as wide-angle antenna 23, 23'.

The various components of the reflector assembly 46 may be fabricated from any of a wide range of radio reflective materials, such as metals and metal alloys, that would be suitable for reflecting radio waves at the particular frequencies involved. Consequently, the present invention should not be regarded as limited to a reflector constructed from any particular material. However, by way of example, in one embodiment, the various components of reflector assembly 46 are fabricated from steel.

Generally speaking, it will be desirable to size the reflector assembly 46 so that the various dimensions thereof are integer multiples (i.e., "n") of one quarter of a wavelength (i.e., $\lambda/4$) of the particular radio frequency band or bands comprising the radio signals. More specifically, in one embodiment, the length 60 of open end 58 of reflector assembly 46 should be sized so that it is an integer multiple of one quarter of a wavelength (i.e., $n\lambda/4$) of the particular radio frequency band or bands involved. Similarly, the distance 64 between the antenna element 44 and the rear reflector 53 (or corner 53), as well as the spaced-distance 66 between the top and bottom plates 48 and 50 may also be selected to be an integer multiple of one quarter of the wavelength (i.e., $n\lambda/4$) of the particular radio frequency band or bands being used.

The reflector assembly 46 advantageously causes the resulting directional antenna 20 to have a radiation pattern 22 that comprises the high and low gain regions 24 and 34 in the manner already described and schematically illustrated in FIGS. 3 and 4. Thus, when mounted to an object, such as a blast hole drill rig 14, the various antennas 20 may be oriented so that the high gain regions 24 substantially define the detection zones 26 and so that the low gain regions 34 of adjacent antennas 20 are also adjacent one another or overlap to define the zones of diminished sensitivity 37. In the embodiment illustrated in FIGS. 1 and 2, the various directional antennas 20 are mounted to the drill rig 14 so that the zone of diminished sensitivity 37 has a length 82 that is about 1 meter from each corner 38 of drill rig 14.

Figure 9:
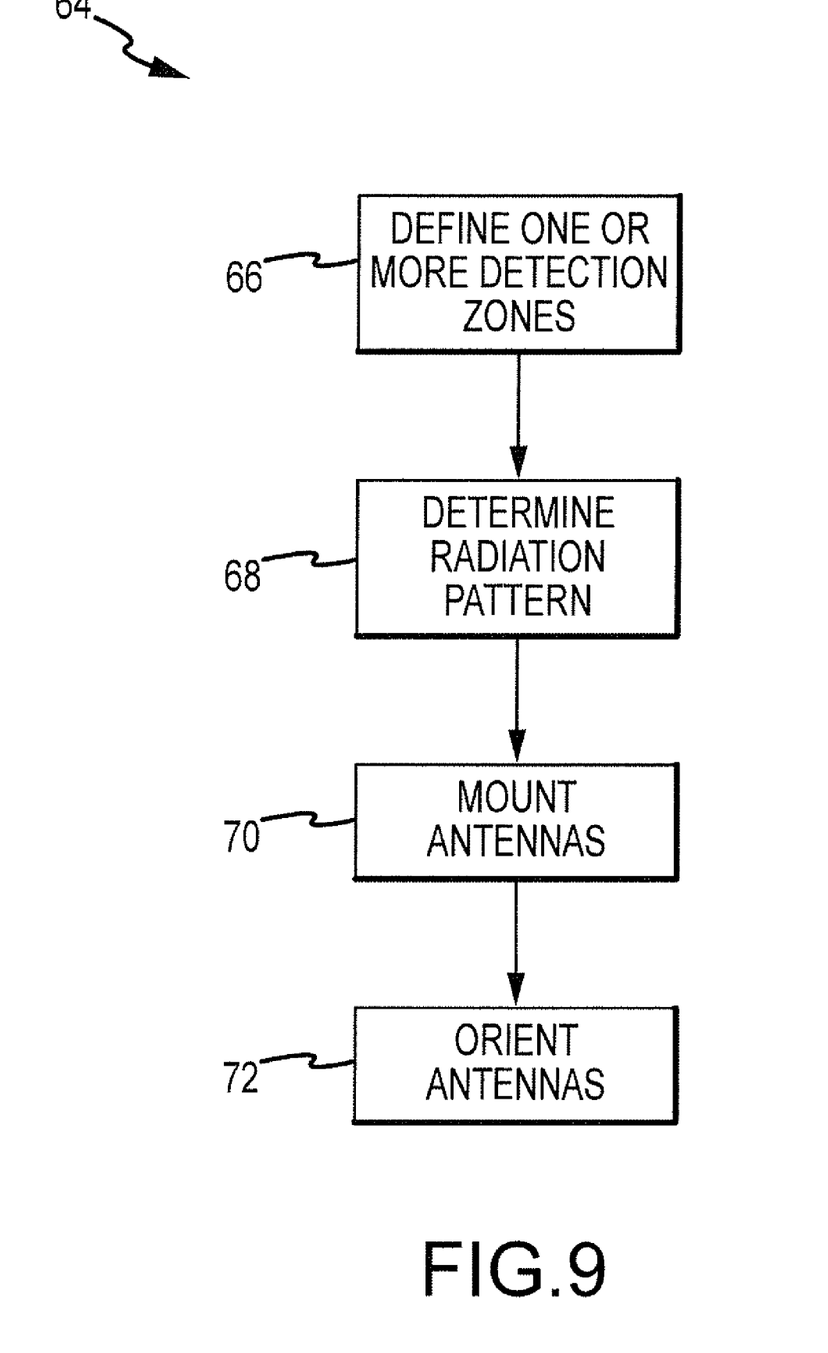
FIG. 9 is a flow chart of a method of for determining an antenna configuration.

Referring now to FIG. 9, a method 64 for determining an antenna configuration involves defining at least one detection zone 26 around an object at step 66. For example, in the case where the object comprises a drill rig 14, step 66 involves defining detection zones 26 around the drill rig 14 wherein it will be necessary or desirable to detect another object 12, such as a man or service vehicle. Generally speaking, it will be desirable to define detection zones 26 completely around the drill rig 14 in order to assure that all objects will be detected and located regardless of their position around the drill rig 14. However, in an alternate embodiment, it may not be necessary to define detection zones completely around the vehicle or object. For example, if the object is permanently located adjacent a wall or hill wherein no objects to be detected will be located, then it would not be necessary to define a detection zone in such an area.

In any event, once the one or more detection zones (e.g., 26) have been defined, a radiation pattern for the directional antenna(s) 20 be used is then determined at step 66. For example, in the embodiment shown and described herein wherein the directional antenna 20 comprises a reflector assembly 46, the radiation pattern 22 for the directional antenna 20 comprises a high gain region 24 that is flanked on either side by a low gain region 34, as best seen in FIGS. 3 and 4. It should be noted that step 66 need not involve an actual measurement of the radiation pattern of the particular directional antenna that is to be utilized, although it could. In an alternate arrangement, the radiation pattern could be determined actually (e.g., via an antenna range) or computationally (e.g., via a computer model). In still yet another arrangement, the radiation pattern could be intuitively determined.

Once the detection zone(s) have been defined (e.g., at step 66) and the radiation pattern determined (e.g., at step 68) for the particular directional antenna or antennas to be used, the directional antennas 20 (e.g., narrow-angle antennas 21, 21' and/or wide-angle antennas 23, 23') can then be mounted to the object (e.g., drill rig 14) at step 70 so that the high gain regions 24 of the antenna(s) coincide with the desired detection zones 26. In an embodiment wherein the directional antenna 20 comprises low gain regions 34 that flank a high gain zone 24, adjacent antennas may be oriented on the object (e.g., drill rig 14) at step 72 so that their respective low gain regions 34 are adjacent one another and define a zone of diminished sensitivity 37 (FIG. 2). The positions and/or orientations of the adjacent antennas 20 may be further adjusted or varied so that their respective low gain regions 34 overlap in order to minimize the zone of diminished sensitivity 37.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

The invention claimed is:

1. A radio-based position location system for determining a relative position of a first object with respect to a second object, comprising:
   a first radio operatively associated with the first object, said first radio including a first radio antenna;
   a first directional antenna mounted to the second object, the first directional antenna having a radiation pattern that comprises a high gain region, the first directional antenna being oriented so that the high gain region is directed generally outwardly from the second object and defines a first detection zone;
   a second directional antenna mounted to the second object, the second directional antenna having a radiation pattern that comprises a high gain region, the second directional antenna being oriented so that the high gain region is directed generally outwardly from the second object and defines a second detection zone, wherein the high gain region of said first directional antenna is flanked on either side by a low gain region and wherein the high gain region of said second directional antenna is flanked on either side by a low gain region, the first and second directional antennas being oriented with respect to one another so that a flanking low gain region of said first directional antenna is located adjacent a flanking low gain region of said second directional antenna, the adjacent flanking low gain regions of said first and second directional antennas defining a zone of diminished sensitivity between the first and second detection zones; and
   a second radio connected the first and second directional antennas, said first and second radios exchanging radio signals to determine the relative position of the first object with respect to the second object at least in part by determining a time-of-flight of a radio signal, the radio signals being exchanged via said first directional antenna and the first radio antenna when said first object is in the first detection zone, the radio signals being exchanged via said second directional antenna and the first radio antenna when said first object is in the second detection zone.

2. The position location system of claim 1, wherein the flanking low gain region of said first directional antenna substantially overlaps the high gain region of said second directional antenna, and wherein the flanking low gain region of said second directional antenna substantially overlaps the high gain region of said first directional antenna to minimize an extent of the zone of diminished sensitivity between the first and second detection zones.

3. The position location system of claim 1, wherein the zone of diminished sensitivity has a sensitivity that is about 6 dB lower than a sensitivity of said first detection zone.

4. The position location system of claim 1, wherein said first and second directional antennas are oriented with respect to one another so that an extent of the zone of diminished sensitivity is minimized.

5. The position location system of claim 1, wherein said first and second directional antennas are oriented with respect to one another so that the first and second detection zones are substantially contiguous with one another but do not substantially overlap.

6. The position location system of claim 1, wherein said first directional antenna and said second directional antenna each comprise an omnidirectional antenna and a reflector assembly operatively associated with said omnidirectional antenna.

7. The position location system of claim 6, wherein said reflector assembly further comprises:
   a top plate;
   a bottom plate positioned in generally parallel, spaced-apart relation to said top plate;
   a first side reflector extending substantially between said top and bottom plates; and
   a second side reflector extending substantially between said top and bottom plates, said top and bottom plates and said first and second side reflectors defining an open end of said reflector assembly, the open end of said reflector assembly having a length.

8. The position location system of claim 7, wherein the length of the open end of said reflector assembly is an integer multiple of one quarter of a wavelength of the radio signal.

9. The position location system of claim 7, wherein said omnidirectional antenna is mounted at about the open end of said reflector assembly at a location that is substantially equidistant from said first and second side reflectors.

10. The position location system of claim 7, wherein said omnidirectional antenna has a length and wherein the spaced distance between said top and bottom plates is substantially equal to the length of said omnidirectional antenna.

11. The position location system of claim 7, wherein said first and second side reflectors intersect one another at an angle and define a corner.

12. The position location system of claim 11, wherein a distance between said omnidirectional antenna and said corner is an integer multiple of one quarter of a wavelength of the radio signal.

13. The position location system of claim 7, further comprising a rear reflector extending substantially between said top and bottom plates, said rear reflector intersecting said first and second side reflectors.

14. The position location system of claim 13, wherein a distance between said omnidirectional antenna and said rear reflector is an integer multiple of one quarter of a wavelength of the radio signal.

15. The position location system of claim 1, wherein said first and second radios comprise position-enabled mesh network radios.

16. An antenna configuration for a second object to allow a first object nearby the second object to be detected and located by means of a time-of-flight radio system, said antenna configuration comprising a plurality of directional antennas mounted to the second object, each of said plurality of directional antennas having a radiation pattern that comprises a high gain region, the plurality of directional antennas being oriented with respect to the second object so that the high gain regions of the plurality of directional antennas are directed generally outwardly from the second object and define corresponding detection zones, the time-of-flight radio system including a first radio and a second radio, the first radio being operatively connected to a first radio antenna, the second radio being operatively connected to said plurality of directional antennas mounted to the second object, the time-of-flight radio system exchanging radio signals between at least the first and second radios to determine the relative position of the first object with respect to the second object, the radio signals being exchanged between the first radio antenna and the one of said plurality of directional antennas that corresponds to the detection zone in which the first object is located, wherein at least one of said plurality of directional antennas comprises an omnidirectional antenna and a reflector assembly operatively associated with said omnidirectional antenna, said reflector assembly comprising     a top plate;

a bottom plate positioned in generally parallel, spaced-apart relation to said top plate;

a first side reflector extending substantially between said top and bottom plates; and     a second side reflector extending substantially between said top and bottom plates, said top and bottom plates and said first and second side reflectors defining an open end of said reflector assembly, the open end of said reflector assembly having a length.

17. The antenna configuration of claim 16, wherein the length of the open end of said reflector assembly is an integer multiple of one quarter of a wavelength of the radio signal.

18. The antenna configuration of claim 16, wherein said omnidirectional antenna is mounted at about the open end of said reflector assembly at a location that is substantially equidistant from said first and second side reflectors.

19. The antenna configuration of claim 16, wherein said omnidirectional antenna has a length and wherein the spaced distance between said top and bottom plates is substantially equal to the length of said omnidirectional antenna.

20. The antenna configuration of claim 16, wherein said first and second side reflectors intersect one another at an angle and define a corner.

21. The antenna configuration of claim 20, wherein said omnidirectional antenna is mounted at about the open end of said reflector assembly at a location that is substantially aligned with the corner defined by the intersection of said first and second side reflectors.

22. The antenna configuration of claim 20, wherein a distance between said omnidirectional antenna and the corner defined by the intersection of said first and second side reflectors is an integer multiple of one quarter of a wavelength of the radio signal.

23. The antenna configuration of claim 16, further comprising a rear reflector extending substantially between said top and bottom plates, said rear reflector intersecting said first and second side reflectors.

24. The antenna configuration of claim 23, wherein a distance between said omnidirectional antenna and said rear reflector is an integer multiple of one quarter of a wavelength of the radio signal.

* * * * *